United States Patent [19]

Defrancesco

[11] Patent Number: 4,769,051
[45] Date of Patent: Sep. 6, 1988

[54] FILTERED ENVIRONMENTAL CONTROL SYSTEM

[75] Inventor: Gregory L. Defrancesco, Simsbury, Conn.

[73] Assignee: United Technologies Corporation, Hartford, Conn.

[21] Appl. No.: 109,634

[22] Filed: Oct. 19, 1987

[51] Int. Cl.[4] .............................................. B01D 53/04
[52] U.S. Cl. ........................................ 55/179; 55/196; 55/208; 55/222; 55/268
[58] Field of Search ................... 55/23, 25, 26, 27, 74, 55/179, 180, 208, 222, 267, 268, 387, 196; 62/18

[56] References Cited

U.S. PATENT DOCUMENTS

| | | | |
|---|---|---|---|
| 2,257,478 | 9/1941 | Newton | 55/179 X |
| 3,989,478 | 11/1976 | Jones | 55/23 X |
| 4,265,088 | 5/1981 | Funk | 55/23 X |
| 4,285,917 | 8/1981 | Knight | 55/23 X |
| 4,312,851 | 1/1982 | Isalski et al. | 55/23 X |
| 4,522,636 | 6/1985 | Markbreiter et al. | 55/23 |
| 4,545,787 | 10/1985 | Hegarty | 55/25 X |
| 4,557,735 | 12/1985 | Pike | 55/26 |
| 4,698,073 | 10/1987 | Rohde et al. | 55/208 X |

Primary Examiner—Robert Spitzer
Attorney, Agent, or Firm—Lloyd D. Doigan

[57] ABSTRACT

An air conditioning system, being powered by a supply of compressed air, has an air cycle machine which incorporates a regenerable filter. The filter receives pressurized air for filtration from the air cycle machine compressor, and receives purge air from the air cycle machine turbine downstream of a load heat exchanger. The air cools the load before purging the filter thereby minimizing system power requirements.

3 Claims, 1 Drawing Sheet

U.S. Patent    Sep. 6, 1988    4,769,051
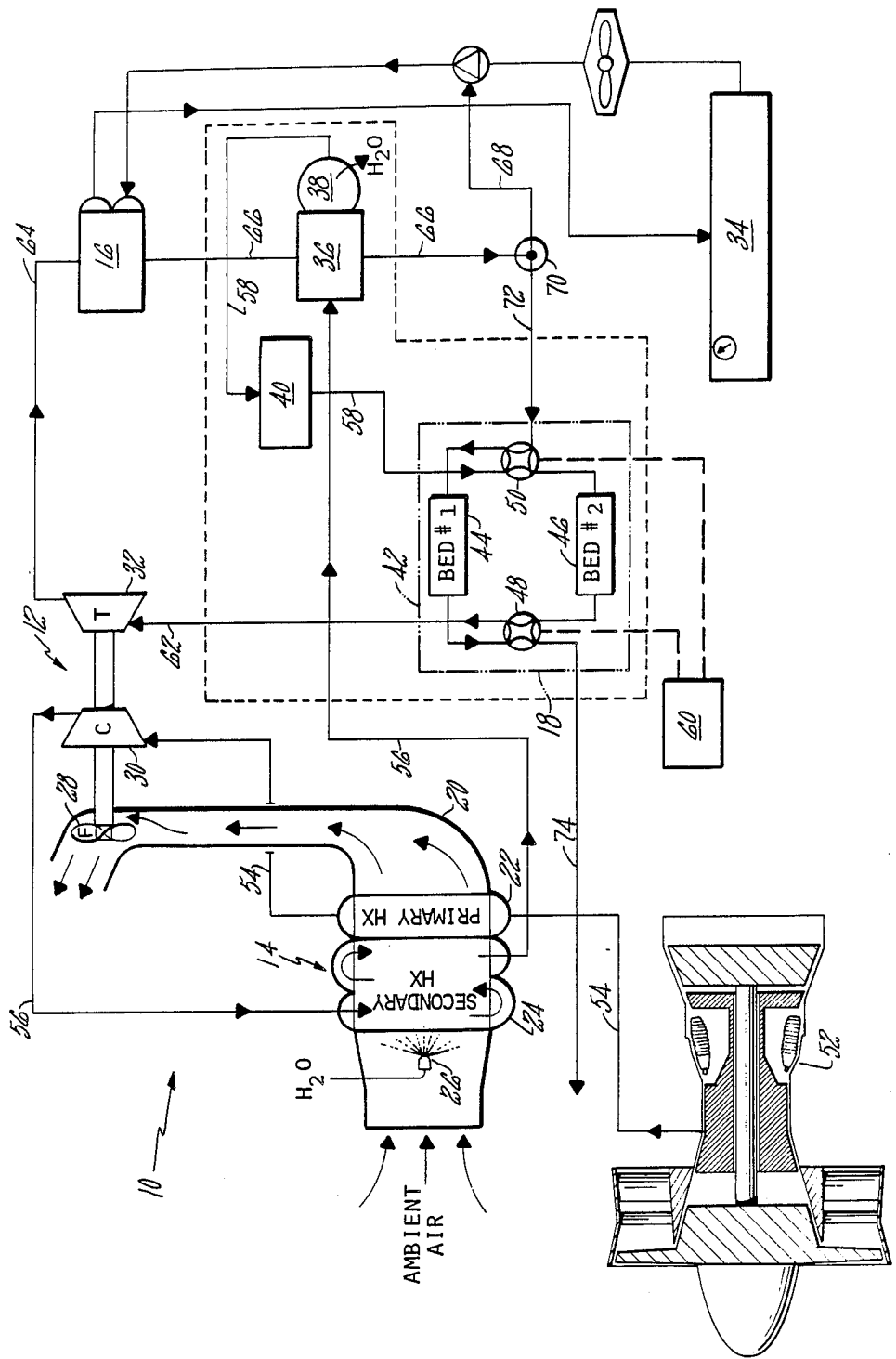

FILTERED ENVIRONMENTAL CONTROL SYSTEM

DESCRIPTION

1. Technical Field

This invention relates to an environmental control system which integrates a regenerable filter system.

2. Background Art

Air cycle environmental control systems are well known. Such systems are generally powered by compressed air which is bled from the compressor section of an engine or an auxiliary power unit (APU). It is known to integrate air filtration systems with environmental control systems to protect the inhabitants within a closed environment. Simple filtration systems, which may include a single stage utilizing charcoal, have a limited life. A limited life is not desirable where the inhabitants must be protected for longer periods of time.

DISCLOSURE OF INVENTION

It is an object of the invention to integrate a regenerable filtration system with an environmental control system to protect the inhabitants within an environment for extended periods of time.

It is a further object of the invention to integrate such filtration systems in environmental control systems while minimizing the power usage of the entire system.

These and other objects of the invention are accomplished by arranging a regenerable filter within an air cycle refrigeration system such that the filter removes contaminants from the high pressure air passing from the system compressor to the system turbine and the filter is purged of its accumulated contaminants by the air passing from the system turbine after it passes through a load heat exchanger.

These and other objects, features and advantages of the present invention will become more apparent in light of the following detailed description of a best mode embodiment thereof, as illustrated in the accompanying drawing.

BRIEF DESCRIPTION OF DRAWING

The FIGURE is a schematic depiction of a filtered environmental control system utilizing a regenerable filter in conjunction with an air cycle environmental control system.

BEST MODE FOR CARRYING OUT THE INVENTION

The filtered environmental control system 10, as shown in the FIG. 1, has several major portions including; an air cycle machine 12, a primary and secondary heat exchanger section 14, a load heat exchanger 16, and a regenerable filter section 18.

Ambient air is drawn into a conduit 20. The air passes through a secondary heat exchanger 24 and a primary heat exchanger 22 and then passes without the system. As is known in the art, water may be sprayed into the secondary and primary heat exchanger by nozzle 26 to increase the cooling provided by the heat exchanger.

The air cycle machine 12 is comprised of coaxial fan 28, compressor 30, and turbine 32. The fan 28 draws the ambient air through the conduit 20. The relatively cool ambient air draws heat from the air passing through the heat exchangers 22, 24. The compressor pressurizes the air input to the system for use downstream thereof. The turbine extracts the heat energy of the air input thereto to drive the compressor and fan, and cools the air as is well known in the art.

The load heat exchanger 16 extracts heat from the air within a closed environment 34 thereby cooling that air.

The regenerable filter section 18 is comprised of a regenerative heat exchanger 36, a water collector 38, an aerosol particulate removal filter 40, and a two bed pressure swing adsorption (PSA) nuclear biological chemical (NBC) filtration system 42. Such a system is available from the Pall Corporation, having offices in Glen Cove, New York. The PSA filter, which requires compressed air for filtration, is comprised of a pair of regenerative beds 44, 46 and a plurality of valves 48, 50 (which are shown schematically). While bed 44 is removing contaminants from the air, the bed 46 is being purged of its accumulated contaminants. Compressed air is not required for decontamination. When the bed 44 is full of contaminants or a relatively safe time period passes, the bed 44 is purged of its contaminants and the other bed 46 may remove contaminants. The process may continue indefinitely.

The air flows through the system as follows. Compressed air, which is supplied by the engine 52 or APU, is directed through the primary heat exchanger to the compressor of the air cycle machine via line 54. The compressor increases the pressure of the air input thereto. The compressed air passes through the second heat exchanger 24 to the regenerative heat exchanger 36 via line 56. The regenerative heat exchanger exchanges some of the heat in the compressed air as will be discussed infra. The compressed air then passes through the water collector 38 which removes any water droplets in the air. The removed water may be directed through a line (not shown) to spray the primary and secondary heat exchangers as discussed supra. The compressed air then passes through the aerosol particulate removal device 40 and is input to the PSA filter via line 58.

The air is fed by valve 50 to bed 44 until that bed can no longer adsorb contaminants or a reasonably safe time period has passed. At that point, the valve is rotated by the controller 60 to allow the air to be fed to the bed 46 which can now adsorb contaminants as will be discussed infra. The decontaminated air is directed through valve 48 by the controller 60 to the turbine 32 via line 62. The turbine extracts the heat from the air thereby driving the compressor and the fan, and expands and cools the air. The air is directed from the turbine via line 64 through the load heat exchanger. The load heat exchanger exchanges the heat within the air of the closed environment with the cool air passing from the turbine. The air then passes through the heat regenerative heat exchanger 36 via line 66. The regenerative heat exchanger exchanges the heat from the air passing in line 56 with the air in line 66 so that the air is the proper temperature, as required by the PSA, for purging the beds of their contaminants. The air is also used to provide make-up air to the closed environment via line 68.

The warmer air passes via line 72 into the PSA filter to act as purge air. While the air passing to the turbine is being decontaminated by the first bed, the second bed is being stripped of its contaminants by the purge air via valve 50. The purge air, along with the decontaminates, is directed via valve 48 through line 74 to the atmosphere.

The controller operates the valves within the PSA filter as is known in the art. Moreover, the controller regulates the amount of air passing to the closed environment via valve 70 as is well known in the art.

By placing the load heat exchanger downstream of the turbine and upstream of the PSA, the maximum amount of cooling can be extracted from the air. Moreover, all the compressed air input from the engine or APU is used for cooling. None of that air is used for purging until its heat extracting ability is utilized. As a result, the amount of bleed air provided by the engine or APU is minimized, thereby increasing the efficiency of the entire system. The amount of cooling per pound of compressed air is greatly enhanced relative to other filtered environmental control systems.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A system for providing filtered, air conditioned air to an environment, said system utilizing an air cycle machine for conditioning said air, said air cycle machine having a compressor, a turbine and a load heat exchanger, wherein air is pressurized by said compressor, communicated to said turbine which expands and cools said air and communicated to said load heat exchanger said system characterized by:

a regenerable filter for removing contaminants from said air, said filter being arranged such that said filter removes contaminants from the pressurized air being communicated from said compressor to said turbine, said regenerable filter being purged of accumulated contaminants by air communicated from said load heat exchanger.

2. The system of claim 1 further characterized by means downstream of said turbine for supplying make-up air to said environment.

3. A compressed air driven system for providing filtered, air conditioned air to an environment, said system utilizing an air cycle machine for conditioning said air, said air cycle machine having a compressor, a turbine and a load heat exchanger, wherein air is pressurized by said compressor, communicated to said turbine which expands and cools said air and communicated to said load heat exchanger said system characterized by:

a regenerable filter for removing contaminants from said air, said filter being arranged such that said filter removes contaminants from the pressurized air being communicated from said compressor to said turbine, said regenerable filter being purged of accumulated contaminants by air communicated from said load heat exchanger.

* * * * *